United States Patent

Milton

[15] 3,659,229

[45] Apr. 25, 1972

[54] SYSTEM AND METHOD FOR AUTOMATIC ADAPTIVE EQUALIZATION OF COMMUNICATION CHANNELS

[72] Inventor: Robert T. Milton, Burnt Hills, N.Y.

[73] Assignee: General Electric Company

[22] Filed: Nov. 2, 1970

[21] Appl. No.: 85,910

[52] U.S. Cl. ....................................333/18, 325/42, 333/70 T
[51] Int. Cl. .............................................................H04b 3/04
[58] Field of Search ........................333/18, 70 T; 325/42, 65

[56] References Cited

UNITED STATES PATENTS 3,403,340 9/1968 Becker et al. ........................333/18 X
3,283,063 11/1966 Kawashima et al. ..............333/18 UX
3,508,172 4/1970 Kretzmer et al. ........................333/18
3,524,169 8/1970 McAuliffe et al. ...................333/18 X

*Primary Examiner*—Paul L. Gensler
*Attorney*—Paul A. Frank, John F. Ahern, Julius J. Zaskalicky, Frank L. Neuhauser, Oscar B. Waddell and Joseph B. Forman

[57] ABSTRACT

An adaptive communication channel equalizer utilizes a digital correlator and an ideal channel model for developing signals that vary the tap weights on a tapped delay line to adjust the impulse response of the cascaded channel-equalizer substantially to that of the ideal channel. A pseudorandom sequence probe signal is added to any data signal simultaneously transmitted over the channel to be equalized, and deviations of the impulse response of the actual channel from the ideal are measured by cross correlating the difference between the actual channel and ideal channel probe signal responses with time advanced and delayed versions of the regenerated probe signal to produce the tap weight control signals.

12 Claims, 3 Drawing Figures

Inventor:
Robert T. Milton,
by Louis A. Moucha

Inventor
Robert T. Milton
by Louis A. Moucha

SYSTEM AND METHOD FOR AUTOMATIC ADAPTIVE EQUALIZATION OF COMMUNICATION CHANNELS

My invention relates to a system and method for automatic adaptive equalization of communication channels which is substantially independent of any data signals being simultaneously transmitted over the channel, and in particular, to a system and method for forcing coincidence of the equalized channel impulse response and the ideal channel impulse response.

Communication channels are subject to various types of distortion which have the undesirable effect of both decreasing data signal transmission speeds as well as degrading the data signal. The technique of equalization, the use of an equalizer consisting of a variable transversal filter and tap weight control circuit for adjusting the transversal filter, is employed to compensate for the channel distortion. The equalization can be performed manually or automatically. The equalization problem becomes complex when the distortion varies in an unknown manner with time such that the manual and automatic equalization techniques are not suitable. The time-varying equalization problem requires a continuously adaptive equalizer which preferably performs the equalizer operation simultaneously with data signal transmission and without affecting such transmission.

An equalizer having the above-described desirable characteristics of operation simultaneously with data transmission has been described in an article by H.R. Rudin, Jr "A Continuously Adaptive Equalizer for General-Purpose Communication Channels," The Bell System Technical Journal, July-August 1969, pps. 1,865–1,884. The latter equalizer uses delayed channel output signals and delayed equalizer output signals and analog cross correlators and slicers for obtaining the signals which control the tap weights on the transversal filter. The analog type correlator is satisfactory where the distortion to be measured is relatively large, but in the case of large or small distortion applications the analog correlator technique is not satisfactory since analog multiplication linearity is limited and analog integration may introduce excessive drift during the integration times required by such analog correlation process. Thus, the digital type cross correlator utilized in my equalizer has greater dynamic range and, when this feature is important, lower implementation costs. Deriving the control signal for the tap weight control from delayed channel signals and delayed equalizer output signals also increases the data signal interference with the probe signal utilized in the cross correlation measurement and requires a time delay circuit which can be expensive to realize. Finally, the Rudin equalizer is of the bandpass type whereas mine is of the baseband type.

Therefore, one of the principal objects of my invention is to provide a new system and method using a digital cross correlator for automatic adaptive equalization of a communication channel.

Another object of my invention is a system and method using the equalizer output signal and a delayed probe signal for deriving the tap weight control of the equalizer transversal filter.

Another object of my invention is a system and method for cross correlating the difference between the actual channel and ideal channel probe signal responses with time advanced and delayed versions of the regenerated probe signal to obtain the tap weight control signals.

A further object of my invention is a system and method of equalizer operation which forces coincidence of the equalized channel impulse response and the ideal channel impulse response at prescribed time intervals.

A still further object of my invention is a system and method for monitoring the channel performance (impulse response) without necessarily equalizing the channel transmission characteristics.

Briefly stated, my invention is an adaptive communication channel equalizer system utilizing a digital cross correlator and ideal channel model for developing signals to adjust the tap weights in a variable transversal filter connected at the output of the communication channel being equalized. A pseudorandom noise sequence probe signal is transmitted simultaneously with the data signal over the equalized channel, and time advanced and delayed versions of the regenerated probe signal are supplied as reference first inputs to the digital correlator. The regenerated probe signal is advanced and delayed by passage through the shift register of 2N + 1 stages corresponding to a like number of stages in the digital correlator and tap weights connected at the correlator outputs. Each shift register stage provides a time delay corresponding to that of a tapped delay line section in the transversal filter to provide synchronization of the probe and regenerated probe signals at the delay line taps and correlator inputs. The regenerated probe signal at the particular stage of the shift register associated with the reference (center) tap weight is also supplied to the ideal channel model. The output of the ideal channel model is subtracted from the equalizer output to thereby obtain complete probe signal cancellation in the ideal case wherein the channel-equalizer cascade is perfectly matched to the channel model. In the more general case, the system output signal consists of the data signals and any unequalized probe signal which is supplied as an error second input to the digital correlator. The degree of match of the channel-equalizer cascade to the ideal channel is substantially independent of any data signals being simultaneously transmitted over the channel.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character and wherein:

Figure 1:
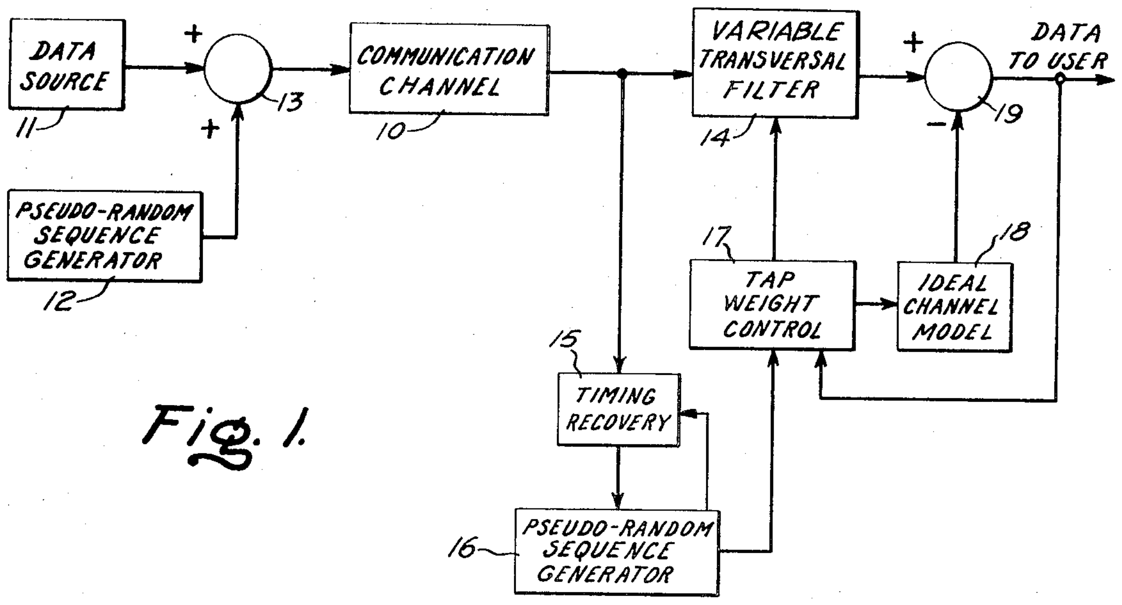
FIG. 1 is a general block diagram of a communication system utilizing an impulse response matching equalizer in accordance with my invention.

Referring now in particular to FIG. 1, there is shown a communication system utilizing an impulse response matching equalizer constructed in accordance with my invention and adapted for equalization of a particular communication channel designated by numeral 10. Channel 10 may be a telephone line or wideband cable transmission system as two examples thereof. A suitable data source 11 generates an analog or digital type data signal having an electrical waveform which is transmitted over channel 10 to a suitable receiver (not shown) for utilization by the user. It is assumed that the data may be transmitted from data source 11 in any of a number of different formats such that the data signal is undefined thereby making it impossible to use the data to measure impulse response deviations in channel 10. Since the channel transfer function is related to the channel impulse response, the hereinafter references to impulse response are assumed to include the transfer function although for conciseness it will not always be so noted. The only constraint on the data is that its maximum average power level and maximum bandwidth be known in order to utilize a proper size correlator. Channel 10 is assumed to exhibit some form of time dispersion such that the signal at the output of data source 11 suffers a linear distortion in passage over channel 10. The particular distortion developed in channel 10 is assumed to vary in some unknown manner with time, that is, the transfer function of channel 10 deviates from the ideal in some unknown manner with time. Finally, it is assumed that it is desired that equalization of channel 10 be continuously maintained without interruption or serious degradation of any data signals being simultaneously transmitted over the channel.

The process of equalization of a communication channel inherently requires a channel monitoring process in order to determine the deviation of the channel transfer function of channel impulse response from the ideal. The FIG. 1 embodiment of my invention utilizes the impulse response matching equalizer of my invention for channel equalization whereas the FIG. 2 embodiment utilizes such equalizer merely for channel monitoring without obtaining channel equalization. The channel monitoring process in my invention utilizes a digital type correlator similar to that described and claimed in a copending patent application Ser. No. 76,829 entitled "System and Method of Channel Performance Monitoring," inventor Donald A. Smith, filed Sept. 30, 1970 and assigned to the assignee of the present invention.

Briefly, the copending Smith application discloses a channel performance monitoring system which uses a pseudorandom noise sequence as a probe signal transmitted simultaneously with the data signal over the channel being monitored. Digital correlator circuitry at the output of the channel measures the cross correlation of the channel output signal with time-advanced and delayed versions of a locally generated pseudorandom noise sequence probe signal by polarity coincidence correlation, it being assumed that the data and probe signals are uncorrelated. The polarity coincidence correlation is obtained by hard limiting the output of the channel and comparing the limited channel output with the time-advanced and delayed probe signal in a modulo 2 adder. The output of the modulo 2 adder is connected to an up-down counter which counts the difference between the total number of agreements and disagreements in the bit levels or polarities of the modulo 2 adder input signals. The output of the counter is thus a measure of the cross correlation of the channel output signal with time advanced and delayed versions of the probe signal, from which the channel impulse response may be determined. Each cross correlation measurement is obtained for a particular time advanced or delay of the local probe signal and a plurality of such measurements over an interval of time are necessary to determine the channel impulse response. My particular monitoring circuit accomplishes the cross correlation measurements during a single time interval, thereby reducing the channel monitoring time as will be described hereinafter with reference to FIG. 3.

Returning to FIG. 1 a pseudorandom noise sequence generator 12 is driven by a clock whose period is equal to the delay between adjacent delay line sections to be described hereinafter and generates a pseudonoise probe signal of the pulse type wherein each pulse leading edge coincides with a clock pulse but the period is a random integral number of the clock pulse period. Sequence generator 12 is an $n$-stage shift register with feedback and generates a maximal length linear binary sequence which is repetitive with the length $2^n-1$ bits and exhibits a quasi impulse autocorrelation function. The probe signal at the output of circuit 12 and the data signal at the output of data source 11 (it being assumed that the data signal is uncorrelated with the probe signal) are combined in a conventional electrical voltage signal summing device 13 in an additive manner. Device 13 may typically be a two-input summing operational amplifier. The summed probe and data signals are thence transmitted over the communication channel 10. The output of channel 10 is connected to the input of my impulse response matching equalizer which includes a variable transversal filter 14 in the form of a tapped delay line comprising a plurality of cascaded time delay sections, described in greater detail hereinafter with reference to FIG. 3. The delay line is tapped at T-second intervals where T is, in general, an equal time delay associated with each section thereof.

A probe timing recovery circuit 15 is connected with a local pseudorandom noise sequence generator 16 in a closed loop at the channel 10 output to form a delay-lock discriminator which regenerates a local version of the probe signal at the input to the tap weight control circuit 17 in phase with the probe signal occurring at the output of channel 10. Sequence generators 12 and 16 are identical shift register and feedback circuits. The output of the tap weight control circuit 17 provides the signals to the variable tap weights connected at the delay line taps in filter 14 for adjustment thereof to the proper gains for equalization of channel 10. The tap weight control circuit 17 includes a third shift register for selectively advancing and delaying the regenerated probe signal relative to a delay line reference tap, and also includes the channel monitoring circuit utilizing the digital correlator hereinabove mentioned. The channel monitoring circuit determines the cross correlation of the difference between the actual channel and ideal channel probe signal responses with time advanced and delayed versions of the regenerated probe signal. Thus, the regenerated probe signal comprises the reference input to the digital correlator. The resultant cross correlation measurement is the signal for adjusting the gains (actual attenuations) of the variable tap weights. The ideal channel probe signal response is obtained by passing the regenerated probe signal through an ideal channel model 18 having an input connected to a particular point in the tap weight control circuit 17 associated with the reference tap weight connected at the center tap of the delay line. The ideal channel model 18 has an impulse response (i.e., transfer function) corresponding to the desired impulse response and transfer function of the communication channel 10, that is, a linearly distortionless channel. The outputs of ideal channel model 18 and variable transversal filter 14 are connected to inputs of a conventional linear comparator 19 for obtaining probe signal cancellation such that the output of comparator 19, which corresponds to the output of my equalized communication channel system, consists only of the data signal to be utilized by a user and any unequalized probe signal. Since the data signal is assumed to be substantially uncorrelated with the probe signal, any unequalized probe signal at the output of comparator 19 comprises the error input to the digital correlator. This error input produces the signals in circuit 17 for adjusting the transversal filter tap weights such that they converge to final gain settings at which the channel impulse response or transfer function of the channel-equalizer cascade is very nearly that of the ideal channel model.

Figure 2:
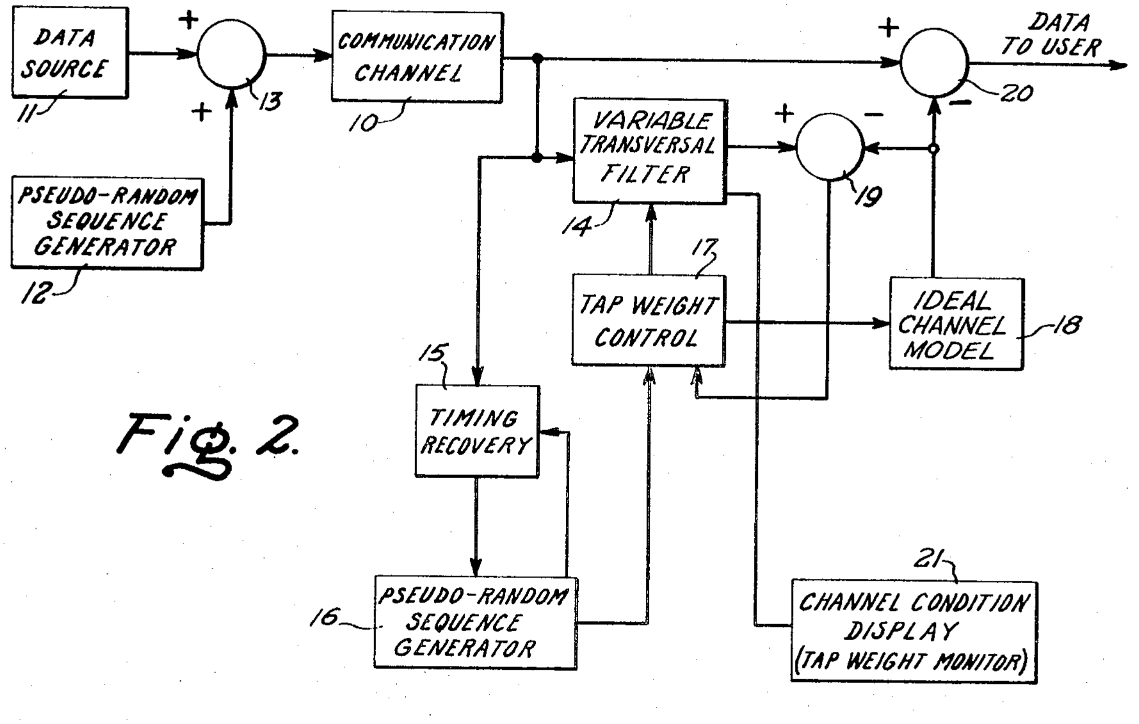
FIG. 2 is a general block diagram of the communication system of FIG. 1 adapted for channel monitoring without equalizing the channel.

Referring now to FIG. 2 there is shown a communication system utilizing my impulse response matching equalizer for monitoring the channel impulse response characteristics, but in this case, not correcting it, that is, the channel is not equalized and the arrangement merely indicates the state of the channel degradation. The components of the equalizer and the interconnections in FIG. 2 are identical with that of FIG. 1, the output of channel 10 being connected to the inputs of the variable transversal filter 14 and probe timing recovery circuit 15, and the outputs of the transversal filter and the ideal channel model 18 being connected to linear comparator 19, the output of which is connected to the channel monitoring circuit of the tap weight control circuit 17. The probe signal generator 12 and the local probe signal generator 16 are identical components as in the FIG. 1 embodiment. The channel monitoring in the FIG. 2 embodiment is obtained in the same manner as in the FIG. 1 embodiment, by cross correlating the difference between the actual channel and ideal channel probe signal responses with time advanced and delayed versions of the regenerated probe signal.

The major distinction between the FIGS. 1 and 2 embodiments is in the use of a second linear comparator 20 in the FIG. 2 embodiment. The outputs of channel 10 and ideal channel model 18 are connected to inputs of comparator 20 and the output thereof is directed to the user. Comparator 20 subtracts the locally regenerated probe signal, as filtered by the ideal channel model 18, from the combined data and probe signals as filtered and distorted by channel 10. Thus, although the output of tap weight control circuit 17 provides the equalizing control signals for adjusting the tap weights in filter 14, as in the FIG. 1 embodiment, the data signals transmitted to the user are not modified by transversal filter 14, that is, the FIG. 2 system merely monitors the channel impulse response of channel 10 without equalizing it. Obviously, taking the system output at the output of comparator 19 would both monitor and equalize the channel.

The second distinction between the FIGS. 2 and 1 embodiments is the addition of a suitable read-out or display 21 of the channel 10 condition. The channel condition display 21 includes a suitable circuit for monitoring the attenuation settings of the variable tap weights connected at the tap points of the tapped delay line in filter 14. Thus, although the FIG. 2 embodiment does not compensate for any time-varying distortions in channel 10 by the process of equalization (assuming system output at output of comparator 20), it does indicate and warn of imminent, serious channel degradation due to the continuous channel monitoring process performed therein.

Figure 3:
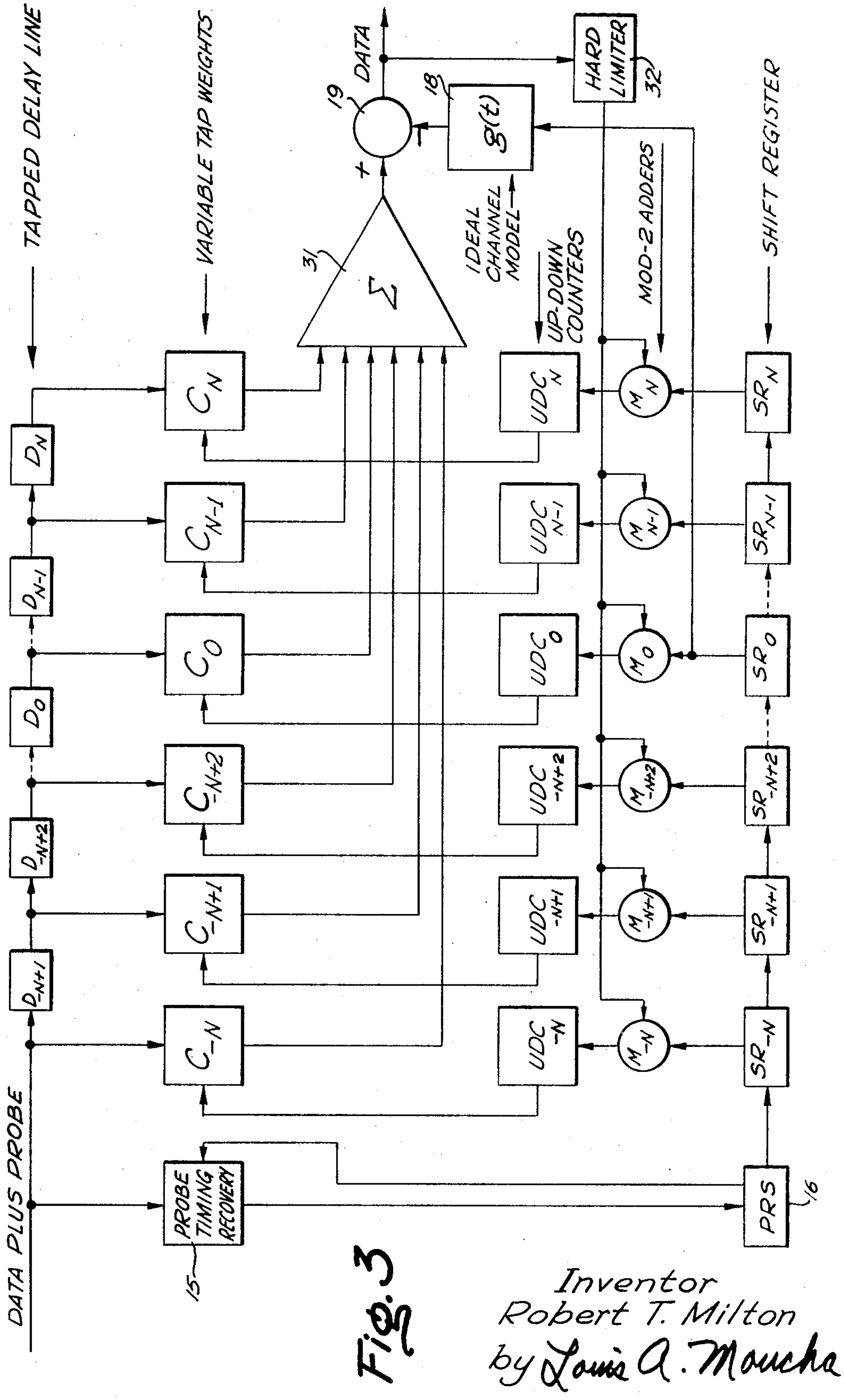
FIG. 3 is a detailed block diagram of the equalizer portion of the communication system.

FIG. 3 is a detailed block diagram of my equalizer and, in particular, indicates the elements of the tap weight control circuit 17 and variable transversal filter 14. Variable transversal filter 14 includes 2N tapped delay line sections designated $D_{-N+1a}$, $D_{-N+2}$, - - -$D_0$ - - - $D_{N-1}$, $D_N$, 2N + 1 variable tap weights $C_{-N}$, $C_{-N+1}$, $C_{-N+2}$, - - - $C_0$, - - - $C_{N-1}$, $C_N$, and a summing amplifier 31. The tapped delay line sections are cascaded identical time delay circuits and may be of the passive type consisting of T-connected inductors and capacitors, or may be of the active type including transistors, inductors and capacitors, or resistors and capacitors. The hereinabove described tapped delay line is of the analog type. The tapped delay line may also be of the digital type utilizing an analog-to-digital converter and a plurality of shift register stages. Thus, the delay line is tapped at T-second intervals where T is the time delay associated with each section thereof. The 2N + 1 variable tap weights C connected at the tap points of the delay line D provide the variable attenuation in the connections between the 2N + 1 delay line taps and the input to conventional summing amplifier 31. The 2N + 1 variable tap weights are conventional attenuator circuits each comprising a four quadrant multiplier for providing multistep attenuations of appropriate polarity, and as examples, may be a field effect transistor (FET) variable resistor circuit, or a resistive ladder network. The delay line sections $D_{-N+1}$, $D_{-N+2}$, - - $D_{-1}$ (i.e., all sections to the left of the reference tap except $D_0$) are designated the leading sections and in conjunction with their associated tap weight attenuator settings determine the equalizer corrections for the corresponding time-displaced portions of the leading portion of the data plus probe signal waveforms at the output of channel 10 whereas the lagging sections $D_{+1}$, - - $D_{N+1}$, $D_N$ and associated attenuator settings determine the lagging portion equalizer corrections.

As mentioned above, tap weight control circuit 17 in FIGS. 1 and 2 comprises a channel monitoring circuit whose output signals determine the attenuator settings of the variable tap weights. As described in greater detail in the aforementioned copending patent application, Ser. No. 76,829, the channel performance monitoring circuit utilizes a digital type correlator for obtaining a measurement of the cross correlation between the channel 10 output signal with time advanced and delayed versions of a locally generated pseudorandom noise sequence probe signal by means of polarity coincidence correlation. Such correlator consists of a hard limiter at the output of the monitored channel, a modulo 2 adder for comparing the levels or polarities of the hard limited probe and data signal with that of the time advanced and delayed versions of the local probe signal, and an up-down counter which counts the difference between the total number of agreements and disagreements in the levels or polarities of the modulo 2 adder input signals from which the cross correlation is determined. Cross correlation measurements must be made for the various time advances and delays $\tau$ of the probe signal in the aforementioned Smith monitoring circuit in order to determine the impulse response of the channel.

I accomplish the cross correlation measurements in a manner similar to that described in copending application Ser. No 76,829, except that I simplify the measurement process by utilizing a shift register SR to accomplish the various time advances and delays $\tau$ of the local probe signal in one step, thereby reducing the time for performing the monitoring function and reducing the equalization time. The output of the delay lock discriminator provides the regenerated probe signal as a reference input to the tap weight control circuit, and in particular, the output of sequence generator 16 is connected to shift register having a plurality of 2N + 1 serial stages corresponding to the plurality of variable tap weights. The shift register stages have outputs connected to corresponding first inputs of a like plurality of modulo 2 adders. Thus, shift register stages $SR_{-N}$, $SR_{-N+1}$, $SR_{-N+2}$, - - $SR_0$, - -$SR_{N-1}$ and $SR_N$ have outputs connected to corresponding first inputs of modulo 2 adders $M_{-N}$, $M_{-N+1}$, $M_{-N+2}$, - - $M_0$, - -$M_{N-1}$ and $M_N$, respectively. Each shift register stage provides a time delay corresponding to the time delay of each tapped delay line section such that the regenerated probe signals at the first inputs of the modulo 2 adders are ideally in phase with the corresponding time delayed or advanced probe signals (relative to the reference tap) at the tap points of the delay line D. The output of a hard limiter circuit 32, having its input connected to the output of comparator 19, is connected to second inputs of the modulo 2 adders and provides a two-level signal as a function of the polarity of the hard limiter input signal. The hard limiter input signal being the unequalized probe signal and uncorrelated data signal is thus the error input to the tap weight control circuit. The two-level signal is compared on a bit-by-bit basis with the two levels of time delayed or advanced probe signals supplied as first (reference) inputs to the modulo 2 adders. The outputs of the modulo 2 adders each yield one level when the levels (or polarities) of the input signals thereto agree, and another level (or polarity) when they disagree. The output of each modulo 2 adder $M_{-N}M_{-N+1}$, $M_{-N+2}$- - - is connected to the input of a corresponding up-down counter $UDC_{-N}$ , $UDC_{-N+1}$, $UDC_{-N+2}$ - - - and the output of each up-down counter is connected to a second input of a corresponding variable tap weight associated therewith. The reference tap weight $C_0$ is connected to the delay line tap (the reference tap) between two usually centrally located delay line sections $D_{-0}$ and $D_{+1}$ (not shown). It should be understood that the reference tap need not be the center tap, although in many cases, it is. The output of the shift register stage $SR_0$ associated with the reference tap is also connected to the input of ideal channel model 18. The $g(t)$ designation is the channel impulse response of the ideal channel model, that is, communication channel 10 without any distortion.

The operation of my equalizer may be described as follows. Initially, all tap weights are set to zero (infinite attenuation) except the reference tap weight $C_0$ which is set to unity. The regenerated or local probe signal at the output of pseudorandom sequence (PRS) generator 16 is time adjusted in the shift register stages SR such that at the output of stage $SR_0$, it is in phase with the probe signal portion of the data plus probe signals occurring at the reference tap. Let it be assumed that, in terms of the well-known paired-echo theory which describes the perturbations of the channel phase and amplitude response in terms of resulting echoes before and after the channel principal response, channel 10 introduces a single positive echo trailing the principal response and that the probe level is too large or too small. Under these conditions, correlation exists between the error signal and the regenerated probe signal at the reference tap as well as at one or more of the taps following the reference tap corresponding to the trailing echo (the taps associated with the tap weight $C_1$ - - $C_N$). Such correlation causes the up-down counter associated with the reference tap of the delay line to overflow (in the case where the probe level is too large) or underflow (when the probe level is too small), reset to zero, and index the associated tap weight in a direction to decrease the error. If the correlation is positive (probe level too large), the counter overflows and causes an increased attenuation setting on the variable reference tap weight. In like manner, if the correlation is negative (probe level too small), the tap weight is decreased to a lesser attenuation setting, teat is, to a relative gain setting greater than unity. Alternatively, the level of the regenerated probe signal at comparator 19 may be controlled in the ideal channel model 18 to obtain the necessary balance of the probe and regenerated probe signal levels in comparator 19 without varying the reference tap weight $C_0$ from it unity setting. Similarly, one or more of the up-down counters $UDC_1$ - - - $UDC_N$ (depending on the duration of the trailing echo) underflow to index the appropriate tap weights to an attenuation and negative polarity such that the trailing echo is cancelled and the equalizer converges to a final setting required to equalize channel 10 to the ideal channel model 18. At such equalization, the reference tap weight $C_0$ will be changed from its nominal unity value to some other setting (assuming the hereinabove alternative method is not used) such that maximum cancellation of the probe signal (existing at the input to the delay line) is achieved in linear comparator 19 and at least one of the lagging tap weights ($C_1$ - - -$C_N$) will have changed from its nominal infinite attenuation to a value and negative polarity such that the gain through the tap weight is equal in magnitude to the relative strength of the channel introduced positive echo. Thus, the equalizer has assumed the impulse response needed to compensate the channel. The equalizer compensates the channel to provide the channel-equalizer cascade with the ideal channel characteristics and also controls the channel gain via the reference tap adjustment whereby a high degree of probe cancellation is obtained at the output of comparator 19 thereby permitting use of a relatively large amplitude probe signals which significantly reduces equipment complexity and, more important, reduces the equalizer convergence time.

As an example of the equipment requirements and performance of my impulse response matching equalizer, in order to equalize a channel having the parameters of bandwidth=4.5 MHz, impulse response duration = 4.0 microseconds, amplitude ripple = 2 dB *p—p* max/Fourier component, and phase ripple = 0.2 radians *p—p*, the equalizer components require a delay line length of 4.0 microseconds, a tap spacing of 0.1 microseconds whereby 41 taps are obtained, a tap weight attenuation increment of 0.001, number of increments required = ± 110 whereby seven stages are required in a binary attenuator, up-down counter stages = eight and a total equalizer convergence time of 1 minute is obtained.

From the foregoing description, it can be appreciated that my invention makes available a new system and method for equalizing and monitoring a communication channel which is especially adapted for wide bandwidth channels, although it is obviously also useful for narrow bandwidth channels. The equalization obtained by my invention results from forcing coincidence of equalized channel impulse response with the ideal channel impulse response at prescribed times as opposed to the more conventional zero forcing equalizer, and it also provides a means for cancelling the probe signal accompanying the data signal before the data is supplied to the user.

Through the use of the probe signal added to the data signal transmitted simultaneously over the channel, the deviation of the impulse response or transfer function of the actual channel from the ideal is measured by comparing the probe at the channel output with a probe regenerated at the receiving equipment and passed through the ideal channel model. The cross correlation of the difference between the actual channel and ideal channel responses with time advanced and delayed versions of the regenerated probe signal produces the signals which adjust the transversal filter tap weights such that they converge to final settings at which the impulse response or transfer function of the channel-equalizer cascade is very nearly that of the ideal channel. My channel equalizer is automatic in that it does not require a manual operation and is adaptive in that should the distortion of channel 10 change with time, the equalizer operates continuously to compare the probe signal at the channel output with the locally regenerated probe signal passed through the ideal channel model and thereby continuously adjusts the transversal filter tap weights to new settings which continuously adjust the impulse response or transfer function of the channel-equalizer cascade to that of the ideal channel. One of the features of my method of channel equalization is that the equalized channel impulse response or transfer function is substantially independent of the data signal and associated noise which may be simultaneously transmitted with the probe signal over the channel. Thus, equalization is performed with many types of data formats which need not be known and such data is transmitted without interruption or serious degradation. It is important to emphasize that my invention forces the equalized channel impulse response to match that of the ideal channel and in general will not have uniformly spaced zeroes corresponding to the delay line tap spacing as is used in the prior art "zero forcing" equalizer. It should be understood that it is the use of the additive, wide band noise-like probe signal which makes possible achieving the desired operating feature of data signal independence, and minimum interference of the data with the probe signal. In conventional analog correlation measurement circuits, the presence of a data signal interferes with the correlation measurement. As a result of my invention, however, the data signal does not substantially interfere with the digital correlation measurements and the probe signal level can be increased in my system. The increased probe signal level permits the monitoring and equalization times to be decreased, and yet cancellation of the probe signal at the output of the equalizer system is realized. Having described two embodiments of my invention, the intended scope of my invention is defined by the following claims.

What I claim as new and desire to secure by Letters Patent of the United States is:

1. An adaptive communication channel equalizer for use in a communication system wherein a pseudorandom noise sequence probe signal is transmitted over a communication channel simultaneously with a data signal and is substantially uncorrelated therewith comprising variable wave shaping means connected to an output of a communication channel for developing controlled amplitude, time displaced electrical waveform signals which may be utilized for equalizing distortions introduced by the communication channel, means in communication with an input to said variable wave shaping means for regenerating a pseudorandom noise sequence probe signal from a like probe signal transmitted over the communication channel simultaneously with a data signal wherein the probe signal is substantially uncorrelated therewith, means connected to an output of said regenerating probe signal means for delaying the regenerated probe signal by predetermined discrete time intervals corresponding to the time displacements of the signals developed by said variable wave shaping means, an ideal channel model having impulse response characteristics corresponding to those of said communication channel without distortion, said ideal channel having an input connected to an output of said regenerated probe signal delaying means associated with a reference point of said variable wave shaping means, means in communication with outputs of said variable wave shaping means and said ideal channel for subtracting the output of said ideal channel from the output of said variable wave shaping means whereby the output of said subtracting means consists of the data signal and any difference between the responses of the probe signal transmitted over the communication channel-variable wave shaping means cascade and the regenerated probe signal transmitted over the ideal channel, and digital correlator means having reference first inputs connected to outputs of said regenerated probe signal delaying means and an error second input connected to an output of said subtracting means for cross correlating the difference between the communication channel and ideal channel probe signal responses with the delayed regenerated probe signals, outputs of said digital correlator means in communication with control inputs of said variable wave shaping means for providing varying correction signals thereto during the condition of the cross correlation being other than zero, the interconnections of said equalizer being a closed loop whereby the correction signals converge to a final value which develops the controlled amplitude, time displaced electrical waveform signals in said variable wave shaping means which represent equalizing signals to adjust the impulse response of the communication channel-variable wave shaping means cascade substantially to that of said ideal channel.

2. The adaptive communication channel equalizer set forth in claim 1 wherein
said variable wave shaping means is a variable transversal filter, and
said regenerating probe signal means is a delay lock discriminator circuit.

3. The adaptive communication channel equalizer set forth in claim 1 and further comprising
means in communication with said communication channel and said ideal channel for subtracting the output of said ideal channel from the output of said communication channel whereby the output of said latter means consists of the data signal transmitted only over the communication channel and any difference between the responses of the probe signal transmitted over the communication channel and the regenerated probe signal transmitted over the ideal channel, and
means in communication with said variable wave shaping means for monitoring the condition thereof whereby the equalizer merely monitors the impulse response of the communication channel without equalizing it.

4. The adaptive communication channel equalizer set forth in claim 1 wherein
said variable wave shaping means comprises
a tapped delay line having a plurality of 2N sections and 2N + 1 tap points,
a plurality of 2N + 1 variable tap weights connected to the delay line tap points,
said regenerated probe signal delaying means being a shift register having 2N + 1 serial stages, said ideal channel having the input thereof connected to the output of a reference shift register stage associated with a reference tap point of said tap delay line.

5. The adaptive communication channel equalizer set forth in claim 4 wherein
each of the 2N sections of the tap delay line provide equal time delay increments, and
each of the 2N + 1 shift register stages provide equal time delay increments corresponding to that of a tapped delay line section,
the reference shift register stage and the center tap of the tapped delay line constituting a reference point whereby said digital correlator means cross correlates the difference between the communication channel and ideal channel probe signal responses with advanced and delayed versions of the regenerated probe signal relative to the reference point.

6. The adaptive communication channel equalizer set forth in claim 4 and further comprising
means in communication with said communication channel and said ideal channel for subtracting the output of said ideal channel from the output of said communication channel whereby the output of said latter means consists of the data signal transmitted only over the communication channel and any difference between the responses of the probe signal transmitted over the communication channel and the regenerated probe signal transmitted over the ideal channel, and
means in communication with said variable tap weights for indicating attenuator settings thereof whereby the impulse response of said communication channel is continuously monitored.

7. The adaptive communication channel equalizer set forth in claim 4 wherein
said digital correlator means comprises
a hard limiter circuit having an input connected to the output of said subtracting means and providing a two-level output signal as a function of the polarity of the input signal thereto, and
a plurality of 2N + 1 modulo 2 adders having reference first inputs connected to corresponding outputs of said shift register stages, and error second inputs connected to an output of said hard limiter circuit.

8. The adaptive communication channel equalizer set forth in claim 7 wherein
said digital correlator means further comprises a plurality of 2N + 1 up-down counters having inputs connected to corresponding outputs of said modulo 2 adders and having outputs in communication with corresponding attenuators in the variable tap weights, an overflow or underflow of one or more of said up-down counters indexing the associated attenuators in the tap weights in the direction which converges the correction signals to the final value corresponding to a condition of maximum cancellation of the probe signal at the output of said subtracting means.

9. The adaptive communication channel equalizers set forth in claim 8 wherein
said variable wave shaping means further comprises a summing amplifier having inputs connected to the outputs of said variable tap weights and an output connected to the input of said subtracting means.

10. A method for adaptive equalization of a communication channel for use in a communication system wherein a pseudorandom noise sequence probe signal is transmitted over the communication channel simultaneously with a data signal and is substantially uncorrelated therewith comprising the steps of
transmitting the probe and data signals over a variable transversal filter connected at the output of the communication channel,
regenerating the probe signal at the input to the variable transversal filter,
delaying the regenerated probe signal by predetermined discrete time intervals corresponding to time displacements of the data and probe signals in passage over the variable transversal filter,
transmitting the regenerated probe signal associated with a reference tap in the variable transversal filter over an ideal channel model having impulse response characteristics corresponding to those of the communication channel without distortion,
subtracting the output of the ideal channel from the output of the variable transversal filter to obtain the data signal and any difference between the responses of the probe signal transmitted over the communication channel and variable transversal filter cascade and the regenerated probe signal transmitted over the ideal channel, and
digitally cross correlating the difference between the communication channel and ideal channel probe signal responses with the delayed regenerated probe signals to provide varying correction signals to the variable transversal filter during the condition of the cross correlation being other than zero, the correction signals causing the variable transversal filter to develop controlled amplitude, time displaced electrical waveform signals which adjust the impulse response of the cascaded communication channel and variable transversal filter substantially to that of the ideal channel.

11. The method set forth in claim 10 wherein the step of digital cross correlation includes
hard limiting the data and any probe response difference signals at the output of the circuit which subtracts the output of the ideal channel from the output of the variable transversal filter to thereby provide a two-level signal as a function of the polarity of the data and probe response difference signals, comparing the levels or polarities of the hard limited probe difference signals and data signals with that of the delayed regenerated probe signals, and counting the difference between the total number of agreements and disagreements in the levels or polarities of the compared signals from which the cross correlation is determined.

12. A method for continuous monitoring of the impulse response of a communication channel for use in a communication system wherein a pseudorandom noise sequence probe signal is transmitted over the communication channel simultaneously with a data signal and is substantially uncorrelated therewith comprising the steps of transmitting the probe and data signals over a variable transversal filter connected at the output of the communication channel, regenerating the probe signal at the input to the variable transversal filter, delaying the regenerated probe signal by predetermined discrete time intervals corresponding to time displacements of the data and probe signals in passage over the variable transversal filter, transmitting the regenerated probe signal associated with a reference tap in the variable transversal filter over an ideal channel model having impulse response characteristics corresponding to those of the communication channel without distortion, subtracting the output of the ideal channel from the output of the variable transversal filter to obtain the data signal and any difference between the responses of the probe signal transmitted over the communication channel and variable transversal filter cascade and the regenerated probe signal transmitted over the ideal channel, and digitally cross correlating the difference between the communication channel and ideal channel probe signal responses with the delayed regenerated probe signals to provide varying correction signals to the variable transversal filter during the condition of the cross correlation being other than zero, the correction signals causing the variable transversal filter to develop controlled amplitude, time displaced electrical waveform signals which adjust the impulse response of the cascaded communication channel and variable transversal filter substantially to that of the ideal channel, subtracting the output of the ideal channel from the output of the communication channel to obtain the data signal transmitted only over the communication channel and any difference between the responses of the probe signal transmitted over the communication channel and the regenerated probe signal transmitted over the ideal channel, and reading-out the settings of attenuators in the variable transversal filter whereby the impulse response of the communication channel is continuously monitored without necessarily accomplishing equalization thereof.

* * * * *